US005687961A

United States Patent [19]

Horn

[11] Patent Number: 5,687,961

[45] Date of Patent: Nov. 18, 1997

[54] FLUID OPERATED CLAMP INCLUDING INTEGRAL FRAME AND SLIDE MEMBER SUPPORT

[75] Inventor: Edward R. Horn, Oconomowoc, Wis.

[73] Assignee: Aladdin Engineering & Manufacturing, Inc., Waukesha, Wis.

[21] Appl. No.: 572,606

[22] Filed: Nov. 30, 1995

[51] Int. Cl.$^6$ .......... B23Q 3/08

[52] U.S. Cl. .......... 269/32; 269/25; 269/34

[58] Field of Search .......... 269/25, 32, 34, 269/145, 153, 201, 228, 229, 237, 238

[56] References Cited

U.S. PATENT DOCUMENTS

| | | | |
|---|---|---|---|
| 2,439,483 | 4/1948 | Merriman | 144/290 |
| 2,815,052 | 12/1957 | Krasnow | 144/290 |
| 2,908,205 | 10/1959 | Furman et al. | 90/59 |
| 2,929,422 | 3/1960 | Tyler et al. | 269/153 |
| 2,972,476 | 2/1961 | Blatt | 269/145 |
| 3,032,331 | 5/1962 | Doty et al. | 269/237 |
| 3,108,794 | 10/1963 | Blatt | 269/233 |
| 3,273,878 | 9/1966 | Blatt | 269/32 |
| 3,302,943 | 2/1967 | Mericle, Jr. | 269/32 |
| 3,362,703 | 1/1968 | Blatt | 269/233 |
| 3,371,923 | 3/1968 | Blatt | 269/32 |
| 3,371,953 | 3/1968 | Blatt | 294/88 |
| 3,381,954 | 5/1968 | Blatt | 269/32 |
| 3,482,830 | 12/1969 | Sendoykas | 269/32 |
| 3,482,831 | 12/1969 | Blatt | 269/32 |
| 3,545,050 | 12/1970 | Blatt et al. | 24/248 |
| 3,570,835 | 3/1971 | McPherson | 269/32 |
| 3,618,931 | 11/1971 | Blatt | 268/94 |
| 3,702,185 | 11/1972 | Blatt | 269/32 |
| 3,874,647 | 4/1975 | Blatt | 269/228 |
| 4,021,027 | 5/1977 | Blatt | 269/32 |
| 4,240,620 | 12/1980 | Tünkers | 269/24 |
| 4,449,745 | 5/1984 | Blatt | 294/88 |
| 4,576,367 | 3/1986 | Horn et al. | 269/32 |
| 4,596,415 | 6/1986 | Blatt | 294/88 |
| 4,620,696 | 11/1986 | Blatt | 269/32 |
| 4,679,782 | 7/1987 | Horn et al. | 269/228 |
| 4,728,137 | 3/1988 | Hamed et al. | 269/228 |
| 4,793,602 | 12/1988 | McPherson | 269/34 |
| 4,838,532 | 6/1989 | Horn et al. | 269/32 |
| 5,072,652 | 12/1991 | Blatt | 92/85 R |
| 5,101,573 | 4/1992 | Mills et al. | 269/238 |

*Primary Examiner*—Timothy V. Eley
*Assistant Examiner*—Lee Wilson
*Attorney, Agent, or Firm*—Michael, Best & Friedrich

[57] ABSTRACT

A pneumatically actuated clamp and gripper including a fluid actuated piston and cylinder assembly and a clamp arm supported for pivotal movement and having a moving end for clampingly engaging a workpiece. The clamp includes a link having one end pivotally connected to the clamp arm for causing movement of the clamp arm and the other end of the link being connected to the piston. The clamp also includes a frame assembly for supporting the clamp arm for pivotal movement, the frame assembly including a pair of frame halves clamped together in face-to-face relation and housing the projecting end of the piston and clamp arm therebetween. The frame assembly includes a pair of pivot pin bores for selectively and alternatively supporting the clamping arm for pivotal movement about a first pivot axis and a second pivot axis. The clamp also includes a roller assembly for supporting the drive member connected to the link for reciprocating movement and for preventing wear of the drive member and the frame components.

1 Claim, 2 Drawing Sheets

FLUID OPERATED CLAMP INCLUDING INTEGRAL FRAME AND SLIDE MEMBER SUPPORT

FIELD OF THE INVENTION

The invention relates to fluid operated clamping and gripping devices and more particularly to fluid operated clamps and grippers of the type for use in holding a workpiece in place during a manufacturing operation such as in a machining operation or in a welding operation and particularly fluid operated clamps and grippers that can be automatically controlled.

BACKGROUND PRIOR ART

A pneumatically actuated clamp for use in gripping a workpiece is shown in applicant's U.S. Pat. No. 4,679,782. In such devices a clamp arm has an end for engaging a workpiece and is supported for pivotal movement about a pivot pin by a frame. A pneumatically driven piston is operatively connected to the clamp arm through a linkage assembly to cause pivotal movement of the clamp arm between a clamping or gripping position and a retracted position.

In operation of a conventional pneumatic clamp, the clamping arm is moved to a position where it begins to apply clamping force on a workpiece and then the clamp arm and driving links will move overcenter to a toggle position wherein the workpiece will be held even if the force of the pneumatic piston is released. As the link and clamp arm move past the toggle position, the stresses in the clamp frame, link and clamp arm can be extreme and can caused deformation of components of the frame supporting the link and clamp arm unless the clamp frames are heavy rigid structures.

SUMMARY OF THE INVENTION

The clamp assembly of the invention includes a frame assembly having sufficient rigidity to withstand the high stresses caused by the clamping action while also having a frame configuration which can be readily machined.

The clamp assembly of the invention also includes a frame configuration which can accommodate one or more clamp arms and clamp arms of various configurations as well as clamp arms supported for pivotal movement about selected alternative pivot axes depending of the structure to be held in place.

In one embodiment the invention includes a pneumatically actuated clamp and gripper including a fluid actuated piston and cylinder assembly including a reciprocating piston having a projecting end movable between a retracted position and an extended position. The clamp includes a clamp arm supported for pivotal movement and having a moving end for clampingly engaging a workpiece, and a link having opposite ends, one end pivotally connected to the clamp arm for causing movement of the clamp arm and the other end of the link being connected to the piston for movement with the piston. The clamp also includes a frame assembly for supporting the clamp arm for pivotal movement, the frame assembly including a pair of frame halves clamped together in face-to-face relation and housing the projecting end of the piston and clamp arm therebetween.

In one embodiment of the invention each of the frame halves includes a side plate positioned on one of the opposite sides of the clamp arm and for supporting the clamp arm, and further includes means for supporting the projecting end of the piston and the other end of the link for movement between a retracted position wherein the clamp arm is in a first position and an extended position wherein the clamp arm is in a second position, the side plate and the means for supporting the projecting end being integrally joined together.

In a preferred form of the invention the frame assembly includes means for supporting the clamp arm selectively and alternatively in a first clamp arm supported position and in a second clamp arm supported position.

In a preferred form of the invention the frame assembly includes a pair of pivot pin bores for selectively and alternatively supporting the clamping arm for pivotal movement about a first pivot axis and a second pivot axis.

In one preferred embodiment of the invention the clamp further includes a clamp arm drive member fixed to the end of the piston and slideably supported between the frame halves of the frame assembly.

In one embodiment of the invention the clamp assembly also includes a roller assembly for supporting the drive member for reciprocating movement and for preventing wear of the drive member and the frame components which would otherwise be caused by the clamping forces in the link during the clamping operation.

DESCRIPTION OF A PREFERRED EMBODIMENT OF THE INVENTION

Figures 1, 2, 3:
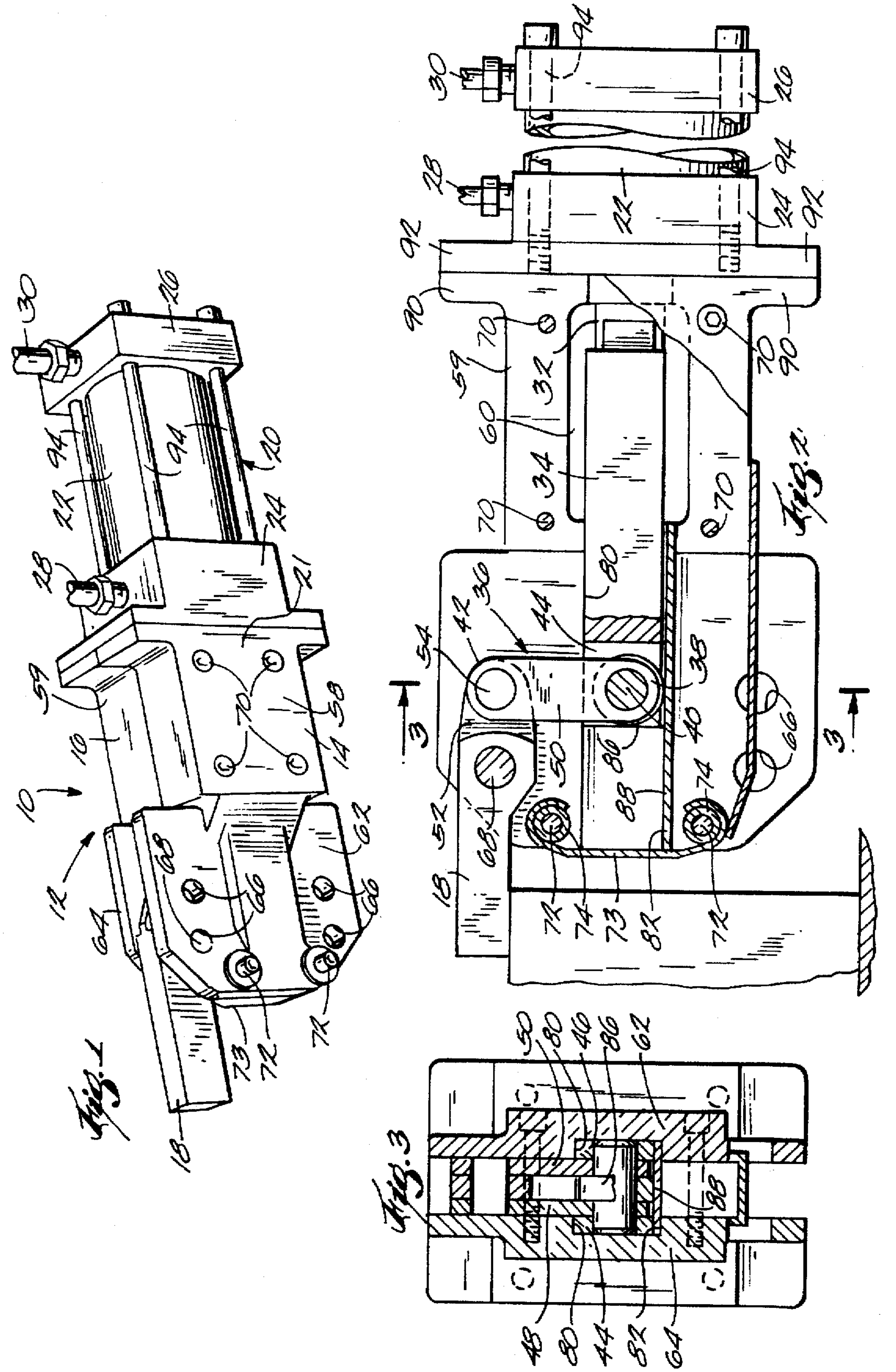
FIG. 1 is a perspective view of a pneumatically actuated gripper embodying the invention.
FIG. 2 is an enlarged side elevation view of the gripper shown in FIG. 1 and with portions broken away.
FIG. 3 is a cross section view taken along line 3—3 in FIG. 2.

Illustrated in FIG. 1 is a fluid actuated clamp 10 embodying the invention and including a frame assembly 12 comprised of a pair of frame members or frame halves 14 and 16 clamped together in face-to-face opposing relation. The frame assembly 12 supports a pivotable clamping arm 18 such that the clamping arm 18 is supported for pivotable movement between a clamping position shown in FIG. 1 and a pivoted retracted position.

The clamp 10 further includes a piston and cylinder assembly 20 fixed to a rearward end 21 of the frame assembly 12. In the illustrated arrangement, the piston and cylinder assembly 20 includes a pneumatic cylinder 22 having opposite ends 24 and 26. Air lines 28 and 30 are connected to the opposite ends 24 and 26, respectively, of the cylinder 22 and selectively provide air under pressure to the opposite ends of the cylinder. A piston is housed in the cylinder 20 and includes a projecting end 32 operably connected to the clamping arm 18 so as to cause pivotal clamping movement of the clamping arm 18 in response to reciprocal movement of the piston in the cylinder.

Figure 4:
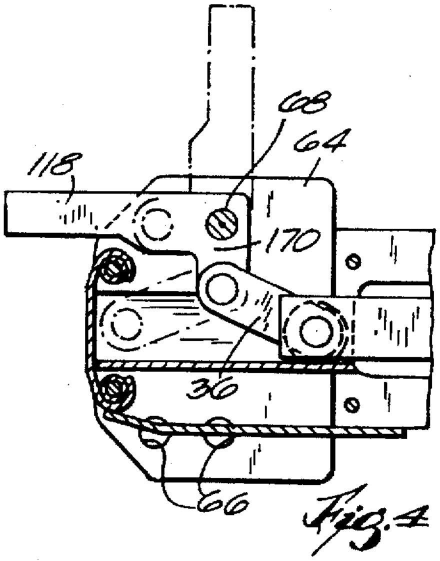
FIG. 4 is a partial side elevation view of an alternative embodiment of the invention.

As best shown in FIG. 2, a yoke or drive member 34 is fixed to the end 32 of the piston for reciprocating movement with the piston. A link assembly 36 is also provided, the link assembly 36 having one end 38 pivotally connected to a forward end of the drive member 34 by a pivot pin 40 and an opposite end 42 pivotally connected to the clamping arm 18. In the illustrated arrangement, the forward end of the drive member 34 includes a pair of spaced apart sides 44 and 46 (FIG. 3) so as to define a clevice housing a pair of link members 48 and 50 which form the link assembly 36. As best shown in FIG. 4, the pivot pin 40 extends through the forward ends of the sides 44 and 46 of the drive member 34 and through the lower ends 48 and 50 of the links in such a manner that the links are pivotal on the pivot pin 40 with respect to the drive member 34. A rearward end 52 of the clamp arm 18 also supports a pivot pin 54 extending through that rearward end 52 of the clamp arm. The pivot pin 54 includes opposite ends projecting from the opposite sides of the clamp arm, the opposite ends of the pivot pin pivotally supporting the upper ends of the links 48 and 50.

Referring more particularly to the construction of the frame assembly 12, the frame halves 14 and 16 are clamped together in opposed face-to-face relation. The frame members 14 and 16 include rearward ends 58 and 59, respectively, each having a central cavity portion 60 adapted to house the forwardly projecting end 32 of the piston and the drive member 34 for sliding reciprocal movement between a clamping position and a retracted position. The frame halves 14 and 16 also include forward end portions 62 and 64, respectively, the forward end portion 62 being integral with the rearward end portion 58, and forward end portion 64 being integral with rearward portion 59. The forward end portions 62 and 64 generally comprise vertically oriented plates and are spaced apart and house the clamp arm 18 therebetween. The frame halves 14 and 16 are joined together by a plurality of bolts extending through the frame halves. In the illustrated arrangement, four bolts 70 extend through the rearward end portions of each of the frame halves and clamp the rearward ends together in face-to-face relation. Additionally, a pair of vertically spaced apart 72 bolts join together the forward ends of the frame halves 14 and 16. The bolts 72 are each surrounded by spacer bushings 74 which separate the forward ends of the plates 62 and 64, and the plates 62 and 64 are clamped against the opposite ends of the spacer bushings 74. The plates are held in spaced apart relation by the spacer bushings 74 so as to define a space adapted to house the clamp arm 18 for free pivotal movement between a clamping position and a retracted position.

In a preferred form of the invention the bolts 72 and bushings 74 also support a cover plate 73 which closes the space between the forward ends of the plates 62 and 64 and resists contaminants from getting between these plates.

In a preferred form of the invention, the plates 62 and 64 include a plurality of sets of axially aligned bores or holes 66 adapted to house the ends of a pivot pin 68 for supporting the clamp arm 18 for pivotal movement. Plural sets of aligned holes 66 are provided in the plates 62 and 64 so as to permit positioning of the pivot pin 68 supporting the clamp arm in alternate positions. Accordingly, the opposed frame halves can accommodate clamp arms 18 having various configurations as illustrated in FIGS. 5–8 as will be described in greater detail below. The pivot pin 68 extends through a selected set of holes 66 in the plates 62 and 64 and extends through the clamp arm 18 so as to pivotally attach the clamp arm 18 to the spaced apart plates 62 and 64 and permit pivotal movement of the clamp arm 18.

As best shown in FIGS. 2 and 3, each of the frame halves 14 and 16 includes an upper track or slide surface 80 adapted to slidably support one side of the upper surface of the yoke 34. The frame halves also include lower tracks or surfaces 82.

One of the advantages of the invention is that by manufacturing the frame assembly as a pair of face-to-face clamped frame halves 14 and 16, the frame halves can each be manufactured as a cast integral structure and the slide surfaces 80 and 82 can be machined into the casting. The frame halves 14 and 16 can comprise a very high strength rigid structure for supporting the clamp arm 18 and the slide member 34 while also providing a support structure which is easily machined so as to form the surfaces 80 and 82.

While in the illustrated arrangement the drive member or yoke 34 is formed as a one piece machined component, in other embodiments the yoke 34 could be comprised of a pair of spaced apart side plates joined together by an end member threaded onto or otherwise joined to the end 32 of the piston. The slide plates are supported for slideable reciprocating movement by the frame halves 14 and 16.

In one embodiment of the invention, means are also provided for supporting the drive member 34 and for opposing the force on the drive member 34 applied by the link assembly 36 during the clamping operation. When the clamp includes a single clamp arm 18 as shown in FIGS. 1 and 2, during the clamping engagement of the clamp arm 18 with a work piece 40, the link assembly 36 will apply a substantial downward force as viewed in FIG. 2, on the drive member 34 tending to force the lower portion of the drive member 34 downwardly against the supporting surfaces of the frame members 14 and 16. In the illustrated arrangement, the means for supporting the drive member 34 includes a roller 86 supported on the pivot pin 40 and between the link members (FIG. 4) for rolling movement. A support plate 88 is supported on the lower slide surfaces 82 of the frame members 14 and 16, and the support plate 88 includes an upper surface for supporting the roller 86 for rolling movement during reciprocation of the piston and drive member 34. The roller 86 thus supports the drive member 34 for rolling movement with respect to the frame members and provides for a relatively low friction engagement between the drive member and the supporting frame.

In a preferred form of the invention, the frame halves 14 and 16 each include a pair of vertically projecting flanges 90 which are adapted to be fixed by bolts or other fasteners to complementary flanges 92 projecting from the end cap of the cylinder so as to rigidly join the cylinder 22 to the rearward end of the frame assembly 12 in a fixed relation. In the illustrated arrangement, the opposite ends 24 and 26 of the cylinder 22 are joined by tie rods 94 which extend through the rearward end cap 26. The forward ends of the tie rods 94 are threaded into threaded bores provided in the end plate 24 adjacent the rearward edge of the frame assembly 12.

An alternative embodiment of a pneumatically actuated clamp embodying the invention is shown in FIG. 4. In the clamp shown in that figure, the clamp arm 18 is pivotally supported by a pivot pin 68 housed in rearward bores 66 provided in the side plates 62 and 64 as alternative pivot pin support bores. The clamp arm 118 has a generally L-shaped or bellcrank configuration with an inwardly extending portion 170 having an end pivotally connected to a link 36 connecting the bellcrank to a drive member 34 in turn connected to the piston of the cylinder assembly.

Figure 5:
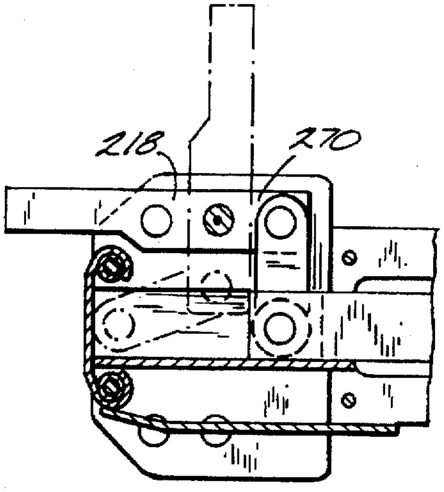
FIG. 5 is a partial side elevation view of another alternative embodiment of the invention.

Another alternative embodiment of the invention is illustrated in FIG. 5. That construction is similar to that shown in FIG. 4 except that the clamp arm 218 has a linear configuration and includes a rearwardly extending portion 270 rearward of the clamp arm pivot pin.

Figure 6:
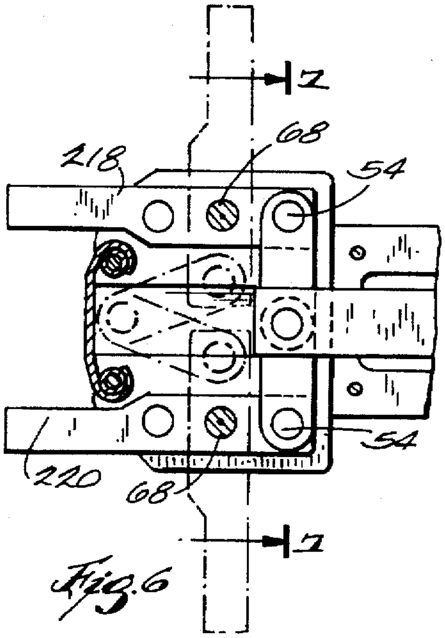
FIG. 6 is a partial side elevation view of another alternative embodiment of the invention.

FIG. 6 illustrates another alternative embodiment of a pneumatically actuated clamp embodying the invention and wherein the clamp includes a pair of clamp arms 218 and 220, the clamp arms 218 and 220 in combination functioning as a gripper for engaging a work piece therebetween. The clamp arm 218 have the same configuration as that illustrated in FIG. 5. A second pair of links 250 are provided for causing clamping or gripping movement of the lower clamp arm 218, the links 250 supported by the pivot pin 40.

Figure 7:
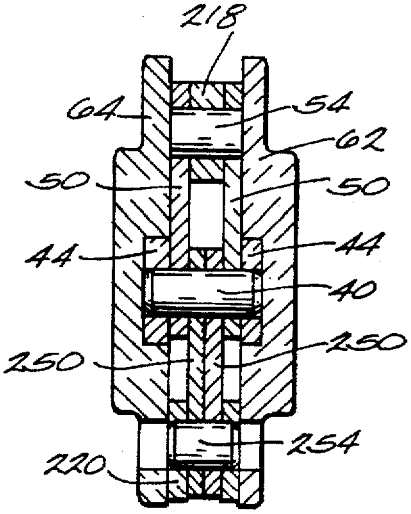
FIG. 7 is a cross section view taken along line 7—7 in FIG. 6.

As best shown in FIG. 7, the pair of links 250 are positioned internally of the links 50 connected to the clamp arm 218, and the second pair of links 250 are connected by a pivot pin 254 to the rearward end of the clamp arm 220 such that reciprocating movement of the drive member causes movement of the clamp arm 220 simultaneously with the clamp arm 218.

Figure 8:
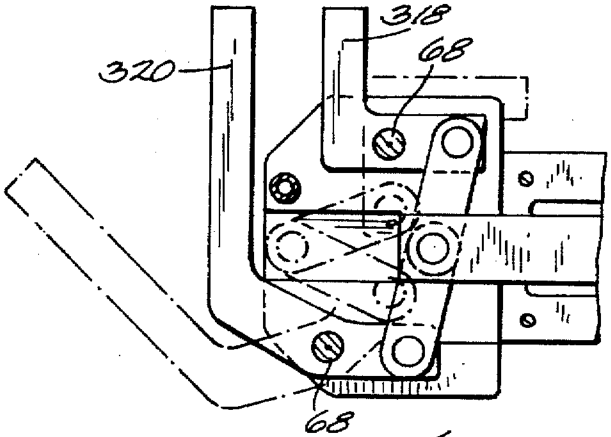
FIG. 8 is a partial side elevation view of another alternative embodiment of the invention.

FIG. 8 illustrates another alternative embodiment of the invention and wherein a pair of clamp arms 318 and 320 are supported by the frame assembly 12, the lower clamp arm 320 being pivotally supported by a pivot pin 68 extending through a forward aligned pair of bores 66 in the spaced apart plates. The upper clamp arm 318 is pivotally supported in a rearward pair of aligned bores in an upper portion of the spaced apart plates 62 and 64.

It will be appreciated by those skilled in the art that the embodiments shown in FIGS. 5–8 are examples of clamp and gripper arrangements which can be produced using alternative clamp arm configurations and that other clamp arm configurations and other mounting arrangements could be employed.

I claim:

1. A clamp for engaging a portion of a workpiece for holding the workpiece in place, the clamp comprising:

a fluid actuated piston and cylinder assembly including a reciprocating piston having a projecting end movable between a retracted position and an extended position, a clamp arm supported for pivotal movement and having a moving end for clampingly engaging a workpiece, a link assembly including spaced apart link members, each link member having opposite ends, one of the opposite ends of each link member pivotally connected to the clamp arm for causing movement of the clamp arm and the other of the opposite ends of each link member being connected to the piston for slideable movement with the piston, a support for supporting the clamp arm for pivotal movement, the support including a pair of spaced apart tracks, and means for supporting the other of the opposite ends of each link member for movement between a retracted position wherein the clamp arm is in a first position and an extended position wherein the clamp arm is in a second position, the means for supporting the other of the opposite end of each link member including a roller and a drive member, the drive member fixed to the end of the piston and having spaced apart arms, wherein the other of the opposite ends of each link member is positioned between the arms of the drive member, and wherein the spaced apart tracks slideably support the arms of the drive member therebetween.

* * * * *